United States Patent [19]

Joutsjoki

[11] Patent Number: 4,663,809
[45] Date of Patent: May 12, 1987

[54] DEFLECTION CONTROL IN A ROLL

[75] Inventor: Jukka Joutsjoki, Pyhtäänkuja, Finland

[73] Assignee: Oy Wartsila Ab, Helsinki, Finland

[21] Appl. No.: 257,397

[22] Filed: Apr. 24, 1981

[30] Foreign Application Priority Data

Apr. 24, 1980 [FI] Finland .................................. 801317

[51] Int. Cl.⁴ .......................... F16C 13/00; B30B 3/04
[52] U.S. Cl. .............................. 29/116 AD; 100/162 B
[58] Field of Search ........... 308/184 A, 26, 20, 184 R, 308/190, 208; 29/116 AD, 113 AD, 116 R, 113 R; 100/162 B

[56] References Cited

U.S. PATENT DOCUMENTS

| | | | |
|---|---|---|---|
| 2,996,784 | 8/1961 | Young | 308/20 |
| 3,389,450 | 5/1966 | Robertson | 29/116 AD |
| 4,305,626 | 12/1981 | Schulz et al. | 308/20 X |
| 4,327,468 | 5/1982 | Küsters et al. | 29/116 AD |

Primary Examiner—Stuart S. Levy
Assistant Examiner—David Werner
Attorney, Agent, or Firm—McAulay, Fields, Fisher, Goldstein & Nissen

[57] ABSTRACT

A method for compensation of load produced deflections in a roll and a roll in which the method is applied. The roll comprises a supporting, non-rotating shaft (1) and a rotatable mantle portion (2) supported thereon by means of a plurality of bearing units (3a, 3b). The bearing units (3a) at the end portions of the shaft (1) are provided with a flexible mounting (6, 8, 9) with respect to the shaft (1) and/or the mantle portion (2). The flexible mounting (6, 8, 9) is connected to flexible elements (4) influencing the support of the mantle portion (2). The spring modulus of the flexible elements (4) is adapted to the stiffness of the shaft (1), so that, under external loading of the roll, the flexible elements (4) allow the ends of said shaft (1) to move radially relative to said mantle portion (2), but resist this movement with an elastic force being dependent on the angle of deflection of said shaft (1), thereby keeping the deflection of said mantle portion (2) within predetermined limits.

20 Claims, 2 Drawing Figures

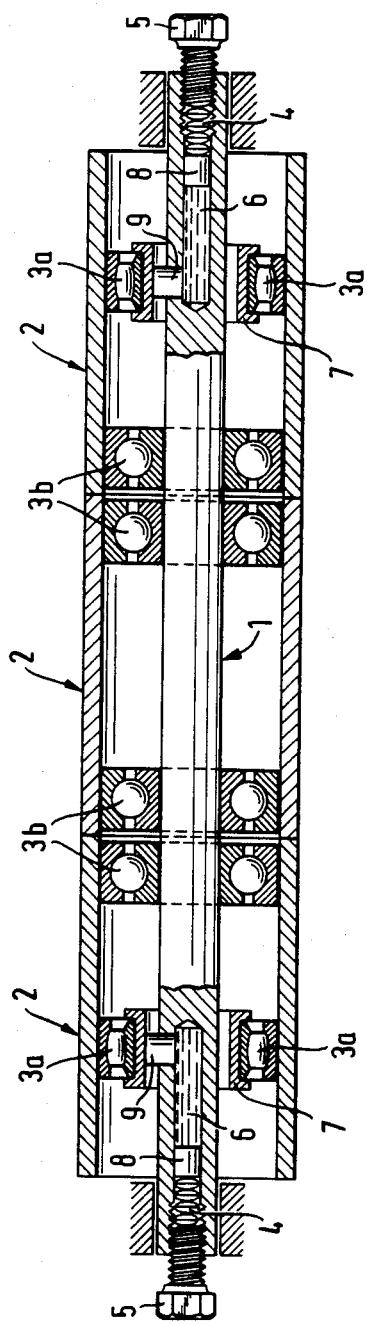

DEFLECTION CONTROL IN A ROLL

BACKGROUND OF THE INVENTION

The invention relates to a method for compensating load produced deflections in a roll, and to rolls in which said method is applied.

Several methods are known for compensating load produced roll deflections. In rolls, having a shaft functionally separated from the roll mantle by means of bearings, the following basic types of deflection compensation can be mentioned, all based mainly on the use of hydraulic control means.

A first group comprises rolls, in which a counter force is produced in the central portion of the roll for preventing deflection of the roll mantle. Then the outermost bearings between the shaft and the mantle are rigidly attached. Constructions of this kind are shown in patent publications GB No. 893 426 and DE No. 1 231 660, FIG. 2.

A second group comprises rolls, in which the counter force is produced by means of a pressure medium element extending all along the roll. In equivalent arrangements there are several pressure medium elements, each associated with a specific bearing, and all connected to a common pressure source. Constructions of this kind are shown in patent publication DE No. 1 561 732 and in FIG. 1 of the previously mentioned patent publication DE No. 1 231 660.

A third group comprises rolls, broadly of the same kind as in the first group, in which the pressure generated can be controlled individually for each bearing. A construction of this kind is shown in patent publication U.S. Pat. No. 3,389,450.

A common feature in all known solutions is the generation of a counter force objecting deflection of the roll mantle. In order to obtain a satisfactory deflection compensation in this manner, the counter force should be selectively controllable at different points of the roll mantle, because variations in the load require corresponding adjustment of the counter force. Constructions allowing such a selective force adjustment tend to become extremely complicated and expensive.

The object of the invention is to eliminate the drawbacks of the known constructions and to create a simple and reliable deflection compensation system. By applying the method according to the invention, the roll can be kept constructionally uncomplicated. When the flexible elements used in the roll are suitably adapted to the roll stiffness, the roll will be self-adjusting. Hence, there is no need for adjustment to meet load variations.

Usually the aim is to keep the mantle of a roll as straight as possible under load. This can be obtained by prestressing, preferably hydraulically, each of the flexible elements to a tension corresponding to the stiffness of the shaft. Such a prestress can favourably be used also when the roll mantle is not supposed to be completely linear under load, but to have a certain curved form. This is feasible, for example, if a conform line pressure is desired in a roll nip, where the counter roll has a slightly curved form.

A favourable design with regard to the adjustment procedure as well as service requirements is obtained, by locating the flexible elements so, that they allow radial yielding motion between the actual bearing unit and the shaft. A particularly uncomplicated and favourable construction is obtained by providing the roll, at its central portion, with at least one rigidly attached bearing unit.

The invention also relates to a deflection control roll, which is made by applying the disclosed method. The characterizing features and the constructional details of such a roll are illustrated in the attached drawing and set forth in the detailed description.

BRIEF DESCRIPTION OF THE DRAWING

In the drawing,

FIG. 2 shows a corresponding section of another embodiment of the invention, with a divided roll mantle.

DESCRIPTION OF THE PREFERRED EMBODIMENT

Figure 1:
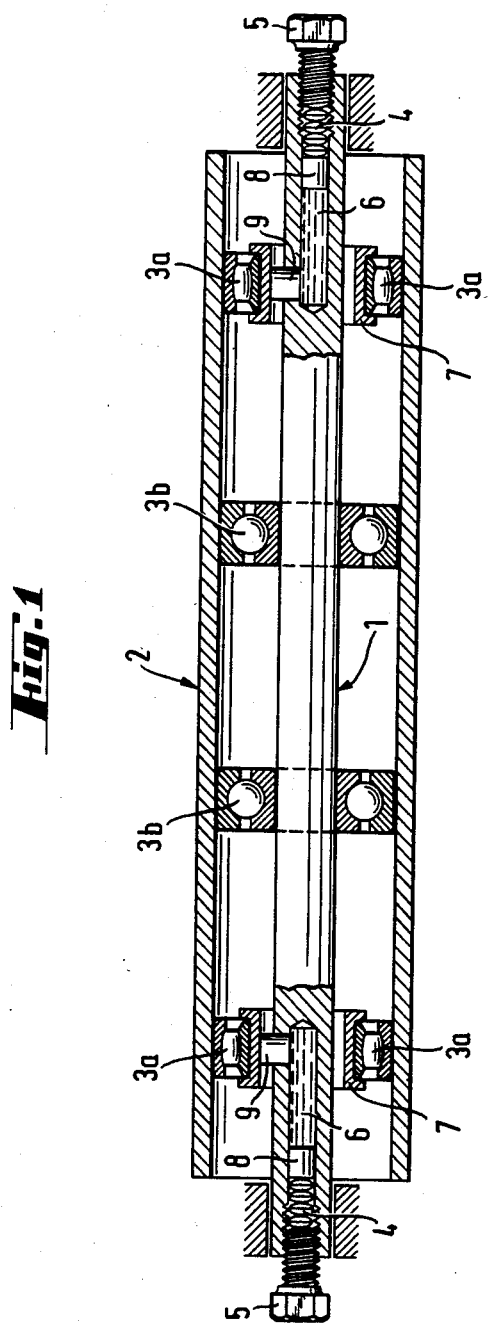
FIG. 1 shows an axial section of an embodiment of the invention.

In the drawing, reference numeral 1 refers to the roll shaft and numeral 2 to the roll mantle, which is journalled on shaft 1 by means of bearing units. The bearing units comprise yielding bearing units 3a at the end portions of the roll and rigid bearing units 3b at the central portion of the roll. The yielding bearing units 3a are each supported by a ring 7 carried by the force of a flexible element 4 by means of a hydraulic power transmission link 6 and pistons 8 and 9. The flexible elements 4 are prestressed by means of a pressure setting screw 5 located at the end of roll shaft 1.

A rigid roll would, when loaded, deflect in the roll shaft as well as in the roll mantle. However, in the shown construction, yielding bearing units 3a will allow the end portions of shaft 1 to move radially relative to mantle 2. Thus, only roll shaft 1 deflects, while mantle 2 remains straight or, depending on the load, obtains a desired form. The deflection of mantle 2 is dependent on the magnitude of the yielding counter force provided by elements 4, which in turn is dependent on the deflection shaft 1. The deflection characteristics of the roll are controlled by adjusting the prestress of flexible elements 4 by means of setting screws 5. Once the prestress has been adjusted to a proper level determined by the stiffness of shaft 1, the shaft itself operates as a self-regulating member under different loads.

A roll construction having a mantle axially divided in several sections is shown in FIG. 2. It operates in the same manner as the one shown in FIG. 1.

The invention is not limited to the embodiments shown, but several modifications thereof are feasible within the scope of the attached claims.

I claim:

1. A method for compensation of load produced deflections in a roll comprising a supporting, non-rotating shaft and a rotatable mantle portion supported on the shaft by means of a plurality of bearing units, including the steps of providing those of said bearing units which are endmost bearing units located at the end portions of said shaft with a flexible mounting with respect to said shaft and/or said mantle portion, connecting said flexible mounting to a flexible spring element influencing the support of said mantle portion, relating the spring modulus of said flexible spring elements to the stiffness of said shaft, in such a manner that, under external loading of the roll, said flexible spring elements, while allowing the ends of said shaft to move radially relative to said mantle portion, resist this movement with spring force being arranged to increase in relation to an increased deflection of said shaft, thereby keeping the deflection of said mantle portion within predetermined limits.

2. A method according to claim 1, including the step of arranging a hydraulic link between each of said flexible spring elements and its corresponding bearing unit.

3. A method according to claim 1, including the step of arranging a clearance allowing said radial yielding movement to take part between a flexibly mounted bearing unit and said shaft.

4. A method according to claim 1; including the step of providing said roll, at its central portion, with at least one rigidly mounted bearing unit between said shaft and said mantle portion.

5. A method according to claim 1, wherein the spring modulus of said flexible spring elements are related to the stiffness of said shaft by prestressing each of said flexible elements to a tension corresponding to the stiffness of said shaft.

6. A method according to claim 2, including the step of arranging a clearance allowing said radial yielding movement to take part between a flexibly mounted bearing unit and said shaft.

7. A method according to claim 2, including the step of providing said roll, at its central portion, with at least one rigidly mounted bearing unit between said shaft and said mantle portion.

8. A method according to claim 5, including the step of providing said roll, at its central portion, with at least one rigidly mounted bearing unit between said shaft and said mantle portion.

9. A deflection compensating roll comprising a supporting, non-rotating shaft and a rotatable mantle portion supported on said shaft by means of a plurality of bearing units axially spaced along said shaft, said roll having at least those of said bearing units forming endmost bearing units located at the end portions of said shaft flexibly mounted with respect to said shaft and/or said mantle portion, and further having flexible spring elements arranged to influence, through said flexibly mounted bearing units, the support of said mantle portion, the spring modulus of said flexible elements being related to the stiffness of said shaft, in such a manner that, under external loading of the roll, said flexible spring elements, while allowing the end of said shaft to move radially relative to said mantle portion, are arranged to resist this movement with a spring force increasing in relation to the deflection of said shaft, thereby keeping the deflection of said mantle portion within predetermined limits.

10. A roll according to claim 9, in which said roll is provided with means for adjustably prestressing each of said flexible spring elements.

11. A roll according to claim 9, in which said flexibly mounted bearing units have a clearance relative to said shaft, thereby providing for said radial yielding movement to take part between said flexibly mounted bearing unit and said shaft.

12. A roll according to claim 9, in which said flexible spring elements are located at the end portions of said shaft, there being a power transmission between said flexibly mounted bearing units and their corresponding flexible spring element by means of a hydraulic link.

13. A roll according to claim 9, in which said roll is provided, at its central portion, with at least one rigidly mounted bearing unit between said shaft and said mantle portion.

14. A roll according to claim 9, in which said mantle portion is axially divided in several units, each being supported, by means of at least one bearing unit, on said shaft, and that at least the outermost mantle units are provided with at least one flexibly mounted bearing unit.

15. A roll according to claim 9, wherein said flexible elements are prestressed to relate the spring modulus thereof to a tension corresponding to the stiffness of said shaft.

16. A roll according to claim 10, in which said flexibly mounted endmost bearing units have a clearance relative to said shaft, thereby providing for said radial yielding movement to take part between said flexibly mounted bearing unit and said shaft.

17. A roll according to claim 10, in which said flexible spring elements are located at the end portions of said shaft, there being a power transmission between said flexibly mounted bearing units and their corresponding flexible spring element by means of a hydraulic link.

18. A roll according to claim 10, in which said roll is provided, at its central portion, with at least one rigidly mounted bearing unit between said shaft and said mantle portion.

19. A roll according to claim 10, in which said mantle portion is axially divided in several units, each being supported, by means of at least one bearing unit, on said shaft, and that at least the outermost mantle units are provided with at least one flexibly mounted bearing unit.

20. A roll according to claim 15, in which said flexibly mounted endmost bearing units have a clearance relative to said shaft, thereby providing for said radial yielding movement to take part between each said flexibly mounted bearing unit and said shaft; and said flexible spring elements are located at the end portions of said shaft, there being a power transmission between said flexibly mounted bearing units and their corresponding flexible spring element by means of a hydraulic link.

* * * * *